United States Patent
Takeishi

(10) Patent No.: US 11,303,768 B2
(45) Date of Patent: Apr. 12, 2022

(54) INFORMATION PROCESSING APPARATUS AND INFORMATION PROCESSING METHOD FOR SETTING METADATA TO IMAGE DATA

(71) Applicant: CANON KABUSHIKI KAISHA, Tokyo (JP)

(72) Inventor: Hiroki Takeishi, Machida (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/983,254

(22) Filed: Aug. 3, 2020

(65) Prior Publication Data

US 2021/0044708 A1 Feb. 11, 2021

(30) Foreign Application Priority Data

Aug. 8, 2019 (JP) .............................. JP2019-146673

(51) Int. Cl.
*H04N 1/00* (2006.01)
*H04L 67/1097* (2022.01)
*G06K 9/62* (2022.01)

(52) U.S. Cl.
CPC ....... *H04N 1/00413* (2013.01); *G06K 9/6256* (2013.01); *H04L 67/1097* (2013.01); *H04N 1/00244* (2013.01); *G06K 2209/27* (2013.01)

(58) Field of Classification Search
CPC .......... H04N 1/00413; H04N 1/00244; G06K 9/6256; G06K 2209/27; H04L 67/1097; H04L 63/10; H04L 67/02; H04L 67/10
USPC ....................................................... 358/438
See application file for complete search history.

(56) References Cited

U.S. PATENT DOCUMENTS

| | | |
|---|---|---|
| 8,970,857 B2 | 3/2015 | Kamata |
| 9,881,225 B2 | 1/2018 | Kodimer |
| 2019/0087444 A1 | 3/2019 | Arakawa |
| 2019/0379797 A1* | 12/2019 | Sahagun ............ H04N 1/00241 |

FOREIGN PATENT DOCUMENTS

| | | |
|---|---|---|
| JP | 2012156824 A | 8/2012 |
| JP | 2017194953 A | 10/2017 |
| JP | 2019057173 A | 4/2019 |

* cited by examiner

*Primary Examiner* — Neil R McLean
(74) *Attorney, Agent, or Firm* — Rossi, Kimms & McDowell LLP

(57) ABSTRACT

Metadata of scanned image data is set based on learning data associated with a saving destination that can be accessed by a user who is performing an operation.

7 Claims, 10 Drawing Sheets

INFORMATION PROCESSING APPARATUS AND INFORMATION PROCESSING METHOD FOR SETTING METADATA TO IMAGE DATA

BACKGROUND OF THE INVENTION

Field of the Invention

The present invention relates to an information processing apparatus for setting metadata to image data.

Description of the Related Art

Japanese Patent Application Laid-Open No. 2017-194953 describes giving additional information (metadata) to be utilized as input data for a subsequent system to image data scanned by an image forming apparatus, and transmitting the image data from the image forming apparatus to the subsequent system. Japanese Patent Application Laid-Open No. 2019-57173 describes calculating a feature amount of a report, and finding similar report data. Japanese Patent Application Laid-Open No. 2012-156824 describes performing error processing for choosing an evacuation saving destination as a transmission destination when transmission of a scanned image fails.

In recent years, it has become common to utilize an external network, for example, a cloud service, as a saving destination of image data. Additionally, it has been considered to set metadata to image data in an image forming apparatus before saving the image data in the cloud service. However, when the metadata is arbitrarily set in the image forming apparatus, the set metadata may not be metadata suitable for the cloud service of the saving destination.

SUMMARY OF THE INVENTION

In one mode of the present disclosure, receiving scanned image data generated according to an operation by a user; setting metadata of the scanned image data, based on learning data associated with a saving destination that can be accessed by the user; and transmitting the scanned image data and the set metadata to the saving destination associated with the learning data used for setting of the metadata are performed.

Further features of the present invention will become apparent from the following description of exemplary embodiments with reference to the attached drawings.

DESCRIPTION OF THE EMBODIMENTS

Embodiment 1

Figure 1:
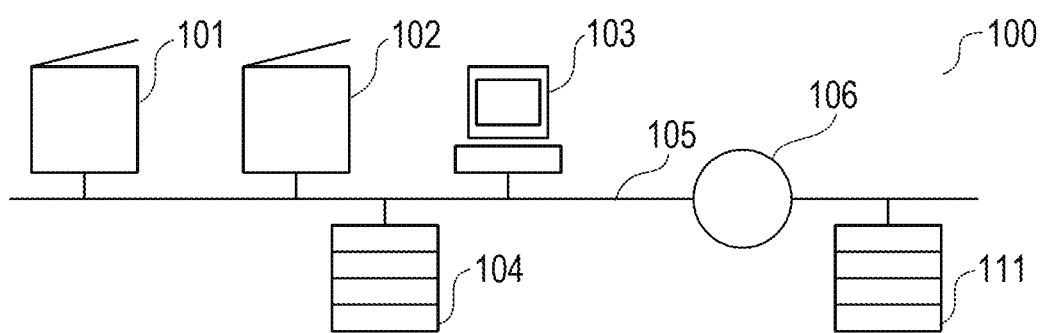
FIG. 1 is a diagram illustrating an example of the system configuration of an image forming system.

FIG. 1 is a diagram illustrating an example of the system configuration of an image forming system.

An image forming system 100 includes image forming apparatuses 101 and 102, an image processing terminal 103, and an image processing server 104. These image forming apparatuses 101 and 102, the image processing terminal 103, and the image processing server 104 can communicate with each other through a network 105. The image forming system 100 is further connected to an external server 111 through an external network 106. This external server 111 can similarly communicate with the image forming apparatuses 101 and 102, the image processing terminal 103, and the image processing server 104 through the network 105 and the external network 106. The external server 111 is an example of an external apparatus.

Although FIG. 1 illustrates the case where there is one image forming apparatuses 101 as an example, a plurality of image forming apparatuses may exist on the same network 105. Note that the network 105 may be a network, which is represented by a LAN (Local Area Network), enabling mutual communication among apparatuses in the image forming system. Additionally, the external network 106 is a wide area network capable of connecting a plurality of networks 105 called the Internet and the WAN, and may be the wide area network enabling mutual communication among the apparatuses in the image forming system 100.

The image forming apparatus 101 can receive a print request (print data) of image data from the image processing terminal 103 and print the image data, and can read image data with a scanner provided in the image forming apparatus 101. Additionally, the image forming apparatus 101 can print the image data read with the scanner (processing commonly called copying). In addition, the image forming apparatus 101 can save the print data received from the image processing terminal 103, and can transmit an image read with the scanner of the image forming apparatus 101 to the image processing terminal 103. Further, the image forming apparatus 101 can request image processing by transmitting the image data to the image processing server 104. Additionally, the image processing server 104 can transmit, to the external server 111, the image data generated as a result of the image processing requested by the image forming apparatus 101, and can request saving of the image data.

Although FIG. 1 illustrates the system configuration in which there are one image processing server 104 and one external server 111 as an example, the number of each server may be arbitrary (one or more). Additionally, when there are a plurality of respective servers, the respective servers may have different roles according to usage. Further, in the configuration illustrated in FIG. 1, the image processing server 104 may also be arranged in a cloud, i.e., the Internet, through the external network 106. In addition to this, the image forming apparatus 101 can achieve functions that the image forming apparatus has, such as an MFP (Multi-Function Peripheral).

Figure 2:
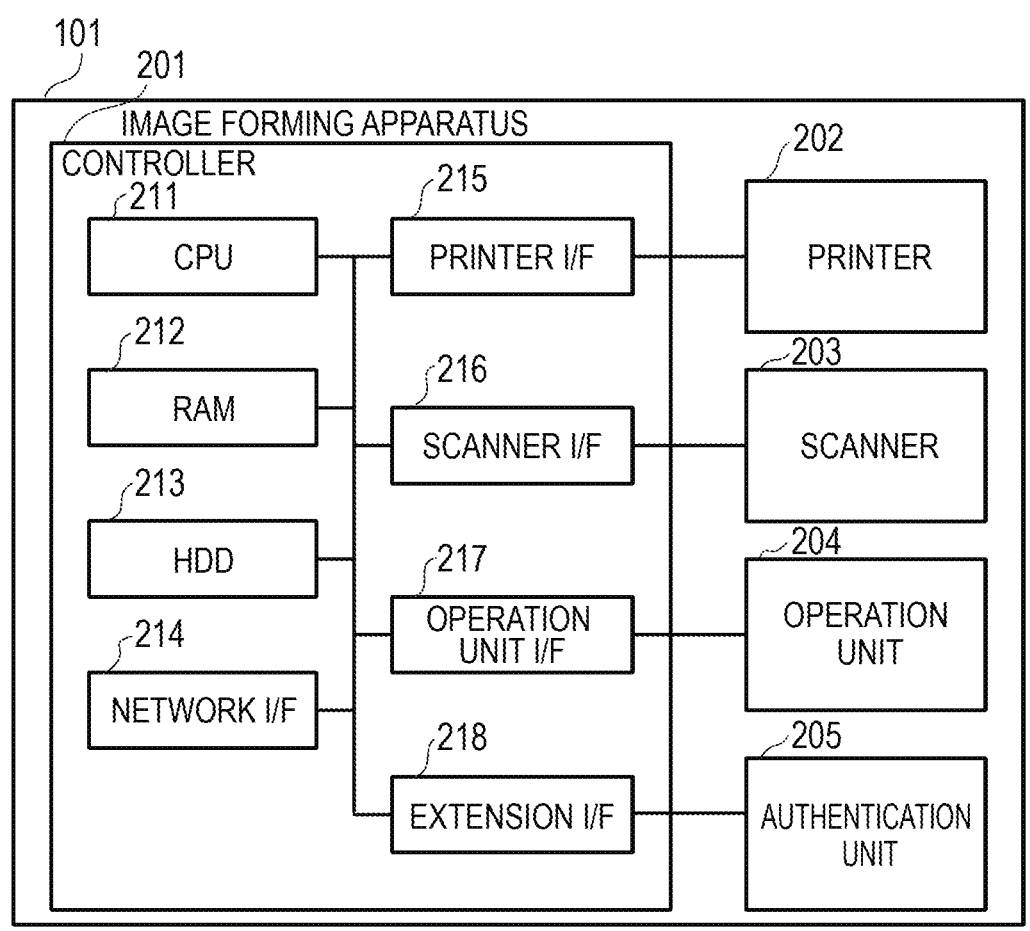
FIG. 2 is a diagram illustrating an example of the hardware configuration of an image forming apparatus.

FIG. 2 is a diagram illustrating an example of the hardware configuration of the image forming apparatus 101. The image forming apparatus 101 includes a controller 201, a printer 202, a scanner 203, and an operation unit 204. The controller 201 includes a CPU 211, a RAM 212, an HDD 213, a network I/F 214, a printer I/F 215, a scanner I/F 216, an operation unit I/F 217, and an extension I/F 218. The CPU 211 can transmit and receive data to and from the RAM 212, the HDD 213, the network I/F 214, the printer I/F 215, the scanner I/F 216, the operation unit I/F 217, and the extension I/F 218. Additionally, the CPU 211 develops a program read from the HDD 213 in the RAM 212, and performs processing based on the program developed in the RAM 212. By performing the processing based on the program by the CPU 211, the functions of the image forming apparatus 101 and the processing of the image forming apparatus of FIG. 5 and FIG. 8 to be described later are achieved.

The HDD 213 can store programs that can be executed by the CPU 211, setting value used in the image forming apparatus 101, data regarding processing requested by a user, etc. The RAM 212 is an area for temporarily storing a program that is read by the CPU 211 from the HDD 213. Additionally, the RAM 212 can also store various kinds of data required for executing the program. For example, in image processing, the image forming apparatus 101 can perform the processing by developing input data in the RAM 212.

The network I/F 214 is an interface for performing network communication with the apparatuses in the image forming system. The network I/F 214 can communicate to the CPU 211 that data reception has been performed, and can transmit data on the RAM 212 to the network 105. The printer I/F 215 can transmit print data transmitted from the CPU 211 to the printer 202, and can communicate the state of the printer received from the printer 202 to the CPU 211. The scanner I/F 216 can transmit an image reading instruction transmitted from the CPU 211 to the scanner 203, can communicate image data received from the scanner 203 to the CPU 211, and can communicate the state received from the scanner 203 to the CPU 211. The operation unit I/F 217 can communicate an instruction from a user that is input from the operation unit 204 to the CPU 211, and can communicate screen information for operation by the user to the operation unit 204.

The extension I/F 218 is an interface that enables connection of an external instrument, such as an authentication unit 205, to the image forming apparatus 101. The extension I/F 218 is provided with, for example, a USB (Universal Serial Bus) type interface. The image forming apparatus 101 can perform specification and authentication of the user through the authentication unit 205 connected to the extension I/F 218. The authentication unit 205 may be a module including a device that can recognize and authenticate the user, such as an IC card authentication device, a fingerprint authentication device, or an iris recognition device. Further, the image forming apparatus 101 can read data stored in an external storage apparatus, and write data to the external storage apparatus by connecting the external storage apparatus, such as a USB memory, to the extension I/F 218.

The printer 202 can print image data received from the printer I/F 215 on a sheet, and can communicate the state of the printer 202 to the printer I/F 215. The scanner 203 can read and digitize information displayed on the sheet placed on the scanner 203 itself, according to an image reading instruction received from the scanner I/F 216, and can communicate the information to the scanner I/F 216. Additionally, the scanner 203 can communicate its own state to the scanner I/F 216. The operation unit 204 is an interface for allowing the user to perform operations for giving various kinds of instructions to the image forming apparatus 101. For example, the operation unit 204 is provided with a liquid crystal display including a touch panel, provides the user with an operation screen, and receives operations from the user. Note that the details of the operation unit 204 will be described later.

Figure 3A:
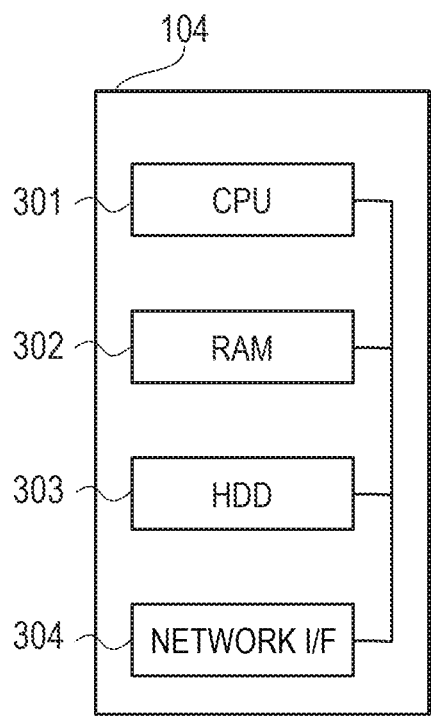
FIG. 3A and FIG. 3B are diagrams illustrating examples of the hardware configuration of a server.

FIG. 3A is a diagram illustrating an example of the hardware configuration of the image processing server 104. The image processing server 104 includes a CPU 301, a RAM 302, an HDD 303, and a network I/F 304. The CPU 301 can administer control of the entire apparatus, and can control transmission and reception of data to and from the RAM 302, the HDD 303 and the network I/F 304. Additionally, the CPU 301 develops a program read from the HDD 303 to the RAM 302, and performs processing based on the program stored in the RAM 302. By executing processing by the CPU 301 based on the program, the functions of the image processing server 104, processing of the image processing server 104 of FIG. 5 and FIG. 8, and processing of the flowcharts of FIG. 6 and FIG. 7 described later are achieved.

The image processing server 104 can perform image processing on the image data received through the network I/F 304 from the image forming apparatus 101. As image processing that can be performed by the image processing server 104, there are OCR (Optical Character Recognition) processing to the image data, and block division processing for dividing the image data into area blocks for respective elements, such as a character string and a background in the image data.

Figure 3B:
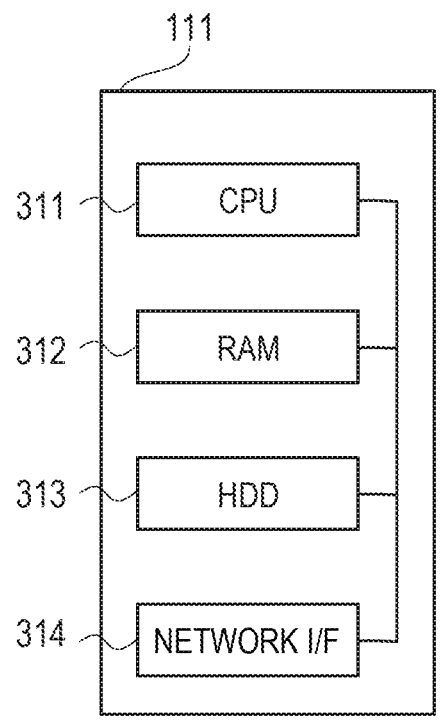

FIG. 3B is a diagram illustrating an example of the hardware configuration of the external server 111. The external server 111 includes a CPU 311, a RAM 312, an HDD 313, and a network I/F 314. The CPU 311 can administer control of the entire apparatus, and can control transmission and reception of data to and from the RAM 312, the HDD 313, and the network I/F 314. Additionally, the CPU 311 develops a program read from the HDD 313 to the RAM 312 and performs processing based on the program stored in the RAM 312. By executing processing by the CPU 311 based on the program, the functions of the external server 111, and processing of the external server 111 of FIG. 5 and FIG. 8 described later are achieved.

The image data received via the network I/F 304 from the image processing server 104 can be accumulated in the HDD 313. Additionally, the external server 111 can give metadata to the received image data, and save the image data in the HDD 313. Table 1 is a table illustrating an example of metadata that can be set to image data.

TABLE 1

| Key | Value Examples |
|---|---|
| File Name | Invoice.jpg |
| Folder | /Invoice |
| Billing Amount | 134343 |
| Deadline | Oct. 25, 2015 |

This table 1 illustrates an example of metadata used for accounting processing. Each of a Key and a Value exists in metadata. Additionally, a value corresponding to the Key can be set to the Value. "Billing amount" and "deadline" can be set to the metadata in this example. Additionally, a file name and a folder name can also be set to this metadata. In the example of Table 1, the Key "billing amount" exists, and a value of a numerical value type can be set to the Key as the Value. Additionally, a date can be set to the Value corresponding to the Key "deadline". In addition, information for identifying a cloud service of a saving destination can be set as the Value corresponding to the Key "connection destination".

As another example, Table 2 illustrates an example of metadata suitable for managing a patent specification. In this example, metadata has a patent number as a Key, and can have the patent number of a specification saved in a Value. Similarly, this metadata has an "inventor" as a Key, and can have the inventor of the specification saved in a Value. Similarly, this metadata has a "company" as a Key, and can have the company name to which the inventor of the specification saved in a Value belongs.

TABLE 2

| Key | Value Examples |
| --- | --- |
| File Name | Patent Specification.jpg |
| Folder | /Patent |
| Patent Number | Patent XXXXX |
| Inventor | Yamada XXX |
| Company | Sato XX Co., Ltd. |

In this manner, by giving metadata to the image data stored in the HDD 313 of the external server 111, the user can search the server by specifying a metadata key. For example, in the example of Table 1, searching can be performed for a document scanned based on "billing amount", etc. Accordingly, by using metadata when searching desired image data, the image forming system 100 enables the user to perform searching with a high accuracy compared with the case where searching is performed with limited information, such as a file name. Additionally, by saving metadata corresponding to a plurality of types of industries or businesses, the image forming system 100 can provide the user with a system for saving and management suitable for various types of industries or businesses.

Additionally, by giving metadata to image data stored in the HDD 313 of the storage server 107, cooperation with a subsequent system can also be smoothly performed. For example, when inputting image data and accounting information to an accounting system, a use case exists in which accounting information needs to be manually posted after uploading a manuscript. By giving metadata required when uploading data, the data can be directly registered with the accounting system, and the efficiency of posting work can be improved.

Figure 4:
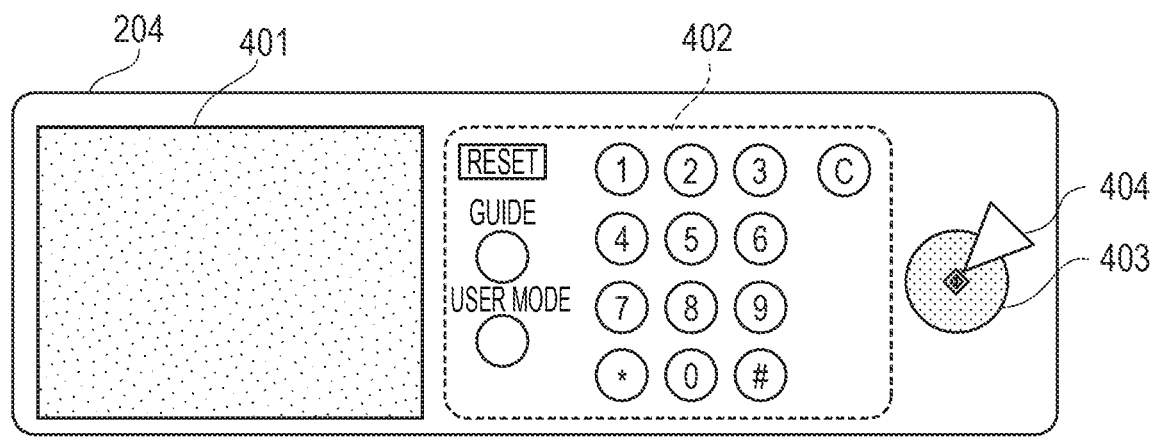
FIG. 4 is a diagram illustrating an example of an operation unit of the image forming apparatus.

FIG. 4 is a diagram showing an example of the operation unit 204 of the image forming apparatus 101. The operation unit 204 includes a touch-panel screen 401, setting keys 402, a cancellation key 404, and a start key 403. The user performs setting of each job by using the touch-panel screen 401 and the setting keys 402, and starts the job by selecting the start key 403. The user can cancel the job that is started once by selecting the cancellation key 404 during the job. As the job referred to here, for example, a copying job, and a job for performing OCR processing on scanned image data in the image processing server 104, and thereafter transmitting the scanned image data to the external server 111 via the network OF 214 can be listed.

A series of information processing in Embodiment 1 in which the image data of a document scanned by using the image forming apparatus 101 is transmitted to the external server 111 with the above-described configuration will be described by using the drawings.

Figure 5:
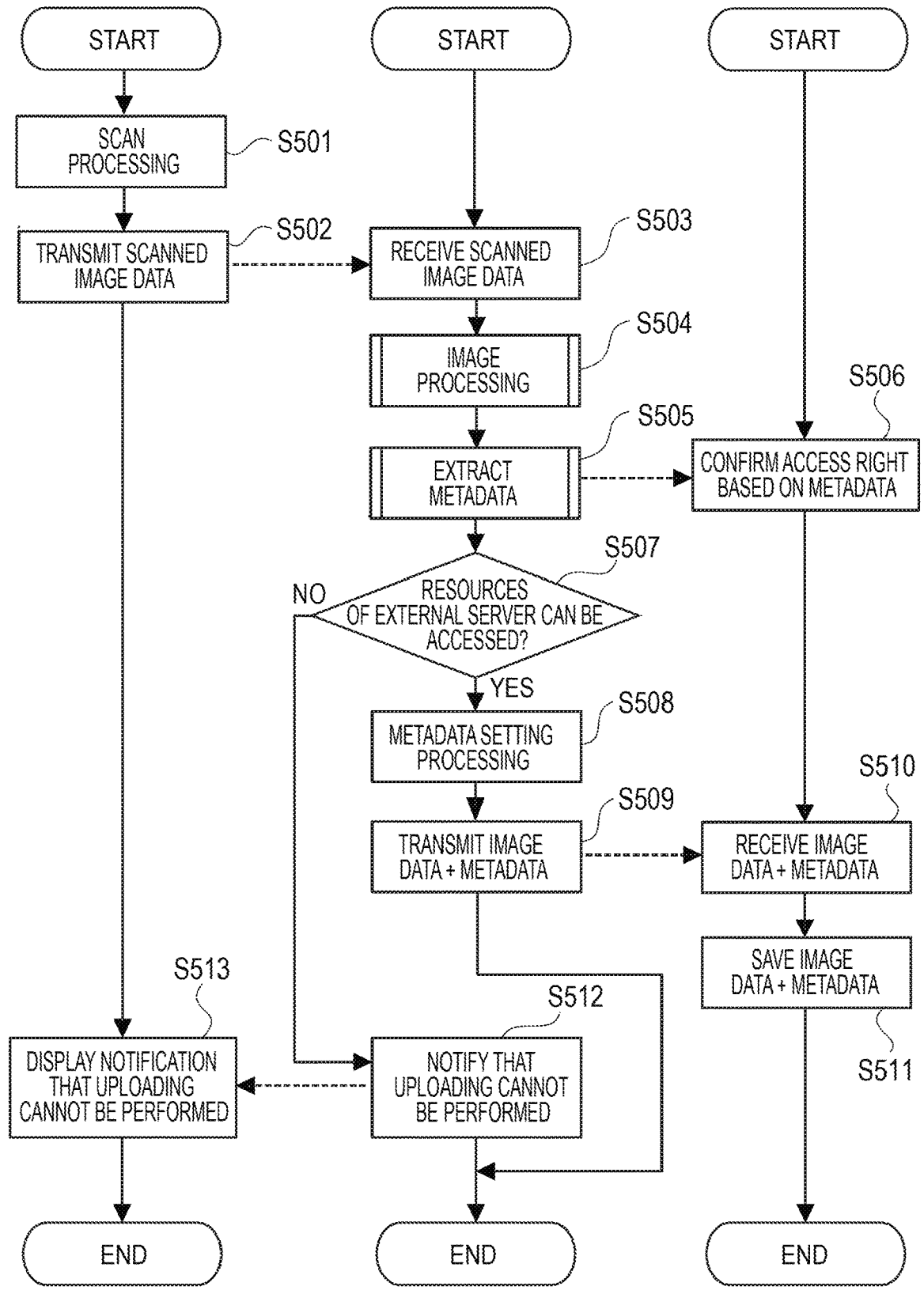
FIG. 5 is a diagram illustrating an example of information processing in the image forming system in Embodiment 1.

FIG. 5 is a diagram illustrating an example of information processing in the image forming system of Embodiment 1.

The processing illustrated in S501, S502 and S513 is processing performed by the image forming apparatus 101. A program related to the processing and the learning data are stored in the HDD 213, read into the RAM 212, and executed by the CPU 211.

Additionally, the processing illustrated in steps S503 to S505 and S507 to 509, and S512 is processing performed by the image processing server 104. A program related to the processing and learning data are stored in the HDD 303, read into the RAM 302, and executed by the CPU 301.

Further, the processing illustrated in steps S506 and S510 to S511 is processing performed by the external server 111. A program related to the processing is stored in the HDD 313, read into the RAM 312, and executed by the CPU 311.

When a scan instruction of a manuscript by selection of the start key 403, etc. is received, in S501, the CPU 211 gives the scan instruction to the scanner 203, scanning is performed, and image data corresponding to the manuscript is generated.

Subsequently, in S502, the CPU 211 transmits the image data generated in S501 to the image processing server 104 via the network I/F 214.

In S503, the CPU 301 of the image processing server 104 detects that the network I/F 304 has received the image data from the image forming apparatus 101.

In S504, the CPU 301 performs image processing for generating data that is required when giving metadata to the received image data.

Figure 6:
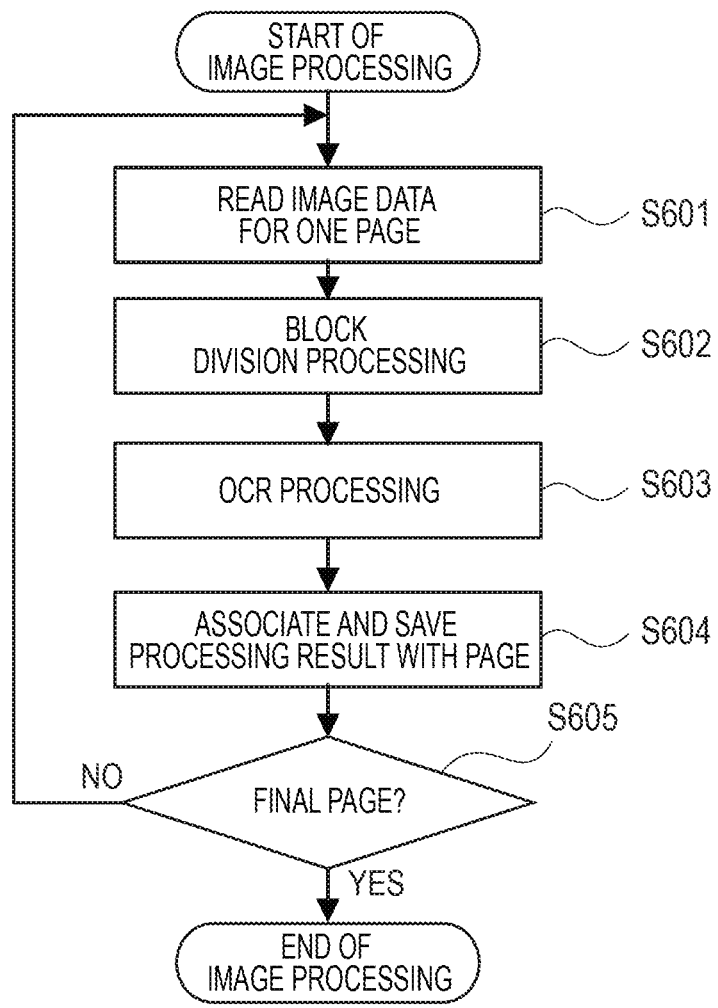
FIG. 6 is a flowchart illustrating an example of image processing.

FIG. 6 is a flowchart illustrating an example of the image processing performed by the image processing server 104 in S504. The program related to the processing illustrated in the flowchart of FIG. 6 is stored in the HDD 303 of the image processing server 104, read by the RAM 302, and executed by the CPU 301.

In S601, the CPU 301 reads the image data for one page of the image data received in S503.

Subsequently, in S602, the CPU 301 performs block division processing on the image data for one page that is read in S601. Here, the block division processing refers to processing for analyzing the report structure of image data, and dividing a background area and a character string area included in the image data. The result of the block division processing is stored in the HDD 303 by associating the attribute of a divided area, i.e., information on whether the area is the background area or the character string area, with position information of the area on the image data. In Embodiment 1, the area on the image data is represented with a rectangle, and the above-described position information is represented by a group of the coordinates of the top left point of the area, the size of the width of the rectangle, and the height of the rectangle. Hereinafter, each of rectangle areas divided as a result of the block division processing is called a "block". Note that the shape of a divided area is not limited to a rectangle, and as long as each of the divided areas is uniquely represented, the area may be defined with an arbitrary shape.

Subsequently, in S603, the CPU 301 reads the block division result stored in the HDD 303 in S602, performs OCR processing on each of the divided areas whose attributes are character strings of the read block division result, and obtains the character code of a character string in the character string area.

Subsequently, in S604, the CPU 301 associates character code information of each character string area obtained in S603 with the position information of the area obtained as a result of the block division processing in S602, and further with the page image data read in S601, and stores it in the HDD 303.

Next, in S605, the CPU 301 determines whether or not the page image data on which S601 to S604 has not been performed exists in the image data received in S503. When such page image data exists (when NO in S605), the CPU 301 repeats the processing in S601 to S605 for the number of remaining page image data. When such page image data does not exist (when YES in S605), the CPU 301 ends the information processing of the flowchart of FIG. 6.

By performing the image processing in the image processing server 104 in the above procedure, for each page image data of the manuscript scanned in S501 in the image forming apparatus 101, the information of the character string included in the image data, and the position information of each character string area can be obtained by being associated with each other.

Figure 7:
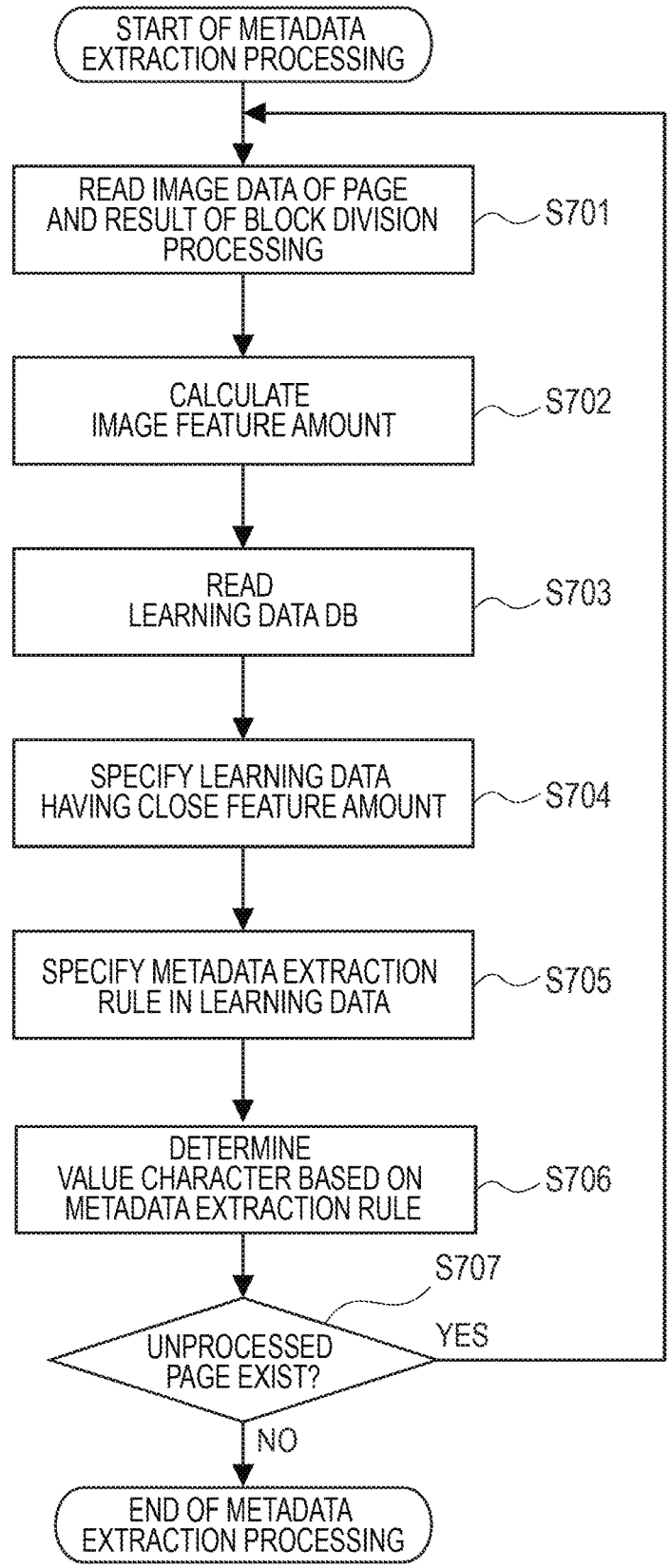
FIG. 7 is a flowchart illustrating an example of metadata extraction processing.

Subsequently, returning to the description of the information processing of FIG. 5, in S505, the CPU 301 generates metadata by using learning data saved in the HDD 313, character information generated in S504, and the position information of each character string area. FIG. 7 is a flowchart illustrating an example of metadata extraction processing in S505.

In S701, the CPU 301 reads the page image data read in S601, and the result of the block division processing.

Subsequently, in S702, the CPU 301 calculates the image feature amount of a target page image data. In calculation of the image feature amount, the CPU 301 uses a method of adopting a block as the feature amount. Hereinafter, although an embodiment using the position information of character will be described, Embodiment 1 can be performed even if the other image feature amount is used. As algorithms other than the image feature amount using the position information of character, there are the SIFT algorithm, the SURF algorithm, the HoG algorithm, etc., which can obtain the characteristic point and image feature amount of an image by using a vector image.

Subsequently, in S703, the CPU 301 reads the learning data saved in the HDD 313. This learning data has information as shown in Table 3 in Embodiment 1.

having the size of (w, h) from the position of (x, y) is shown from the upper left, it is indicated that a first block having feature amounts [10, 12, 102, 11], [414, 15, 32, 12] . . . has the following feature amounts.

$$(x,y)=(10,12)$$

$$(w,h)=(102,11)$$

One or more collections having such block information as elements are the image feature amounts in Embodiment 1.

Further, the learning data in Embodiment 1 can have a plurality of metadata extraction rules. A metadata extraction rule has one or more columns of extraction rules corresponding to the Key of a target metadata. Table 4 is data of one extraction rule picked out from Table 3 for describing this metadata extraction rule. As illustrated in this Table 4, this metadata extraction rule has a numerical value capable of indicating a block the same as elements of the image feature amount, such as the extraction rule [10, 12, 102, 11] corresponding to the Key "file name". This example illustrates a rule of extracting a file name by using the characters existing in the range of [10, 12, 102, 11], i.e., the range having the width and height of [102, 11] from the top left coordinates [10, 12].

TABLE 4

Metadata Extraction Rule 1

| Key | Extraction Rule |
|---|---|
| File Name | [10, 12, 102, 11] |

Table 5 is also data of one extraction rule picked out from Table 3 for describing this metadata extraction rule. As illustrated in this Table 5, this metadata extraction rule indicates a rule specifying the characters "invoice" as the extraction rule corresponding to the Key "folder" as the folder name of a saving destination.

TABLE 5

Metadata Extraction Rule 2

| Key | Extraction Rule |
|---|---|
| Folder | Invoice |

TABLE 3

| Image Feature Amount | Metadata Extraction Rule 1 | | Metadata Extraction Rule 2 | | Metadata Extraction Rule 3 | | Metadata Extraction Rule 4 | | Metadata Extraction Rule 5 | |
|---|---|---|---|---|---|---|---|---|---|---|
| | Key | Extraction Rule | Key | Extraction Rule | Key | Extraction Rule | Key | Extraction Rule | Key | Extraction Rule |
| [10, 12, 102, 11], [414, 15, 32, 12] | File Name | [10, 12, 102, 11] | Folder | /Invoice | Deadline | [414, 15, 32, 12] | Billing Amount | [352, 1434, 120, 14] | Connection Destination | Cloud Service 1 |
| [42, 45, 102, 11], [414, 15, 32, 12] | File Name | [22, 12, 122, 15] | Folder | /Invoice | Deadline | [345, 44, 21, 39] | Billing Amount | [342, 1213, 101, 32] | Connection Destination | Cloud Service 1 |
| [14, 42, 423, 63], [12, 543, 11, 42] | File Name | [44, 200, 401, 21] | Folder | /Invoice | Deadline | [325, 32, 30, 13] | Billing Amount | [134, 1034, 201, 36] | Connection Destination | Cloud Service 1 |

As illustrated in Table 3, the learning data has the image feature amount and a metadata extraction rule. The image feature amount quantitatively indicates the feature of an image. In Embodiment 1, as described above, the block is used as the feature amount. In Embodiment 1, this block is represented by the starting point, and the width and height of a block in the unit of pixels. That is, assuming that a block As described above, the learning data has the rule for picking out the characters on a report as rule information for generating metadata. Additionally, the learning data can also have a fixed character string as the rule information for generating metadata.

Returning to FIG. 7 again, the metadata extraction processing (S505) will be described.

In S704, the CPU 301 specifies the learning data having the closest feature amounts. In this processing, the CPU 301 compares the feature amount using the block with respect to the image data obtained in S702, and the image feature amount in the learning data read in S703. Then, as a result of the comparison between the two, the CPU 301 finds zero or more rows of the learning data having a feature amount that is equal to or closer than a threshold value. This comparison processing is calculated by using a size overlapping with the position and size of the block indicated by the image feature amount.

Subsequently, in S705, the CPU 301 specifies the metadata extraction rule in a row of the learning data having the close feature amount specified in S704.

Subsequently, in S706, the CPU 301 determines the Value corresponding to each Key based on the metadata extraction rule specified in S705. When the extraction rule indicates the position of the characters as illustrated in Table 4, this processing determines the character information of the Value by using the characters obtained by the OCR processing described in S603. For example, in the case of the extraction rule [10, 12, 102, 11], the CPU 301 determines the character information of the Value by using the character information of a location closest to this coordinates block of the characters of the OCR processing obtained in this S603.

Additionally, as illustrated in Table 5, when the extraction rule is the character information, the CPU 301 determines the character string of the Value corresponding to the Key by using the character string of this extraction rule.

Subsequently, in S707, the CPU 301 determines whether there is still any unprocessed page in the read image data. When there is an unprocessed page, the CPU 301 returns to S701 again, and starts metadata setting processing for the next unprocessed page. On the other hand, when there is no unprocessed page, the CPU 301 ends the metadata setting processing.

Assuming that two sets of metadata as illustrated in Table 6 can be obtained with the above processing in Embodiment 1, the subsequent processing will be described below.

Subsequently, in S507, based on the information obtained in S506, the CPU 301 determines whether a resource of the external server 111 (in this case, the folders "written approval" and "invoice" of the external server 111 (cloud service 1)), which will be a saving destination, can be accessed. When there is one or more resources that can be accessed, the CPU 301 proceeds the processing to S508. On the other hand, when a resource that can be accessed is not found, the CPU 301 proceeds the processing to S512. Here, S508 and later, which is a normal system, will be described first.

In S508, the CPU 301 reads the metadata extracted in S505 row by row from the top, and specifies the metadata that is determined to be accessible in the determination in S506. In Embodiment 1, the CPU 301 sets one metadata by using the metadata found first. S505, S507 and S508 are an example of the processing for setting the metadata of the scanned image data, based on the learning data regarding the resource of the external server 111 for which the user has the access right.

Subsequently, in S509, the CPU 301 transmits the scanned image data and the metadata to the external server 111, based on the scanned image data obtained in S503, and the metadata obtained in S508.

In response to this, in S510, the CPU 311 of the external server 111 receives the image data and the metadata.

Subsequently, in S511, the CPU 311 saves the image data and the metadata received in S510 in the external server 111.

With the above, the image forming system 100 ends the information processing of the entire system.

On the other hand, when it is determined in S507 that the external server 111 cannot be accessed, in S512, the CPU 301 transmits, to the image forming apparatus 101, a message indicating that the scanned image could not be transmitted. The processing in S512 is an example of control for causing the operation unit 204 of the image forming apparatus 101 that has generated the scanned image data to display that the scanned image data cannot be transmitted.

TABLE 6

| Key | Value | Key | Value | Key | Value | Key | Value | Key | Value |
| --- | --- | --- | --- | --- | --- | --- | --- | --- | --- |
| File Name | Quotation | Folder | Settled | Deadline | Dec. 31, 2019 | Billing Amount | 45234430 Yen | Connection Destination | Cloud Service 1 |
| File Name | Quotation | Folder | Invoice | Deadline | Apr. 1, 2019 | Billing Amount | 45234430 Yen | Connection Destination | Cloud Service 1 |

The processing after the metadata extraction (S505) will be described below by using FIG. 5 again.

Subsequently, in S506, the CPU 311 obtains an access right based on saving destination information of the scanned image data in the metadata extracted in S505. In the example illustrated in Table 6, "invoice" is obtained as the Value corresponding to the Key folder, and "cloud service 1" is obtained as the Value corresponding to the Key connection destination. Based on this information, the CPU 301 inquires whether the user who has operated the image forming apparatus 101 can write a file into the folder "invoice" in the external server 111 (cloud service 1). This inquiry processing is achieved by communication between the image processing server 104 and the external server 111 by using the known communication technology called REST or SOAP. Of course, Embodiment 1 can be performed even if the image processing server 104 and the external server 111 communicate with each other by using a communication technology other than REST or SOAP.

In response to the message, in S513, the CPU 211 of the image forming apparatus 101 displays, on the operation unit 204, the message that the image data could not be transmitted.

With the above-described processing, the metadata can be added to each page image data of the scanned image data in a manner simple for the user of the image forming apparatus 101. In addition, even if the learning data that other users of the image forming apparatus 101 made the image forming apparatus 101 learn includes the learning data that cannot be utilized by the user, the image forming system 100 selects the learning data that can be accessed from a plurality of kinds of learning data. Accordingly, the user of the image forming apparatus 101 can transmit an image file and metadata to a resource that can be accessed by the user, according to the learning data.

The description of Embodiment 1 ends here.

Modification 1

Modification 1 illustrates processing for re-learning the learning data when the resource of the external server 111 cannot be accessed. With this, folder selection can be enabled even for the user of the image forming apparatus 101 who does not have the access right to the external server 111. Note that, in the description of Modification 1, the configuration and processing procedure that overlap with those of Embodiment 1 will be indicated by the same reference numbers, a description of them will be omitted, and the configuration and processing that are different from those of Embodiment 1 will be mainly described.

Figure 8:
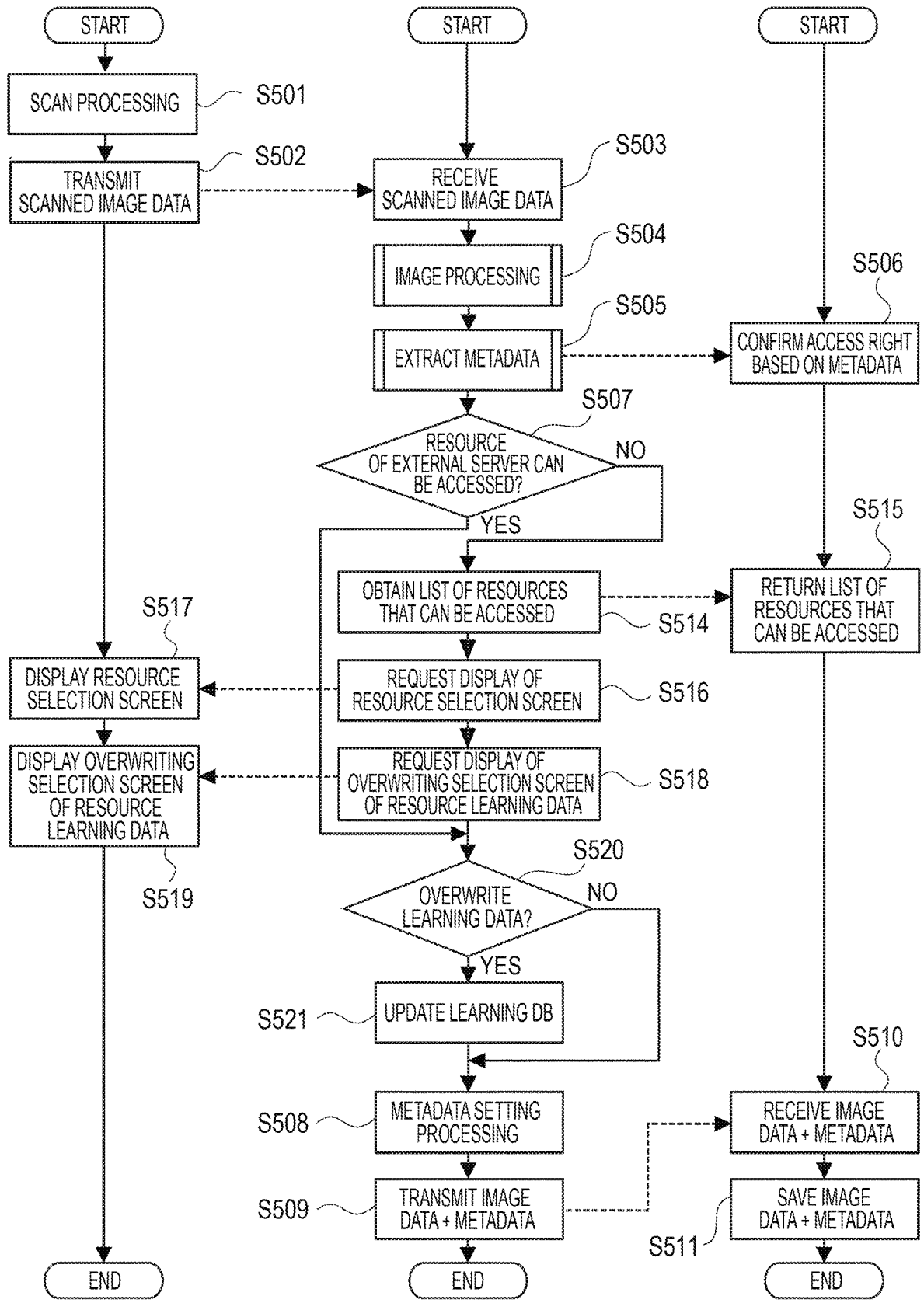
FIG. 8 is a diagram illustrating an example of the information processing in the image forming system in Modification 1.

FIG. 8 is a diagram illustrating an example of the information processing in the image forming system in Modification 1. Hereinafter, the information processing in Modification 1 will be described while using FIG. 8.

As in Embodiment 1, the processing illustrated in S501, S502, S517 and S519 is processing performed by the image forming apparatus 101. A program related to the processing is stored in the HDD 213, read into the RAM 212, and executed by the CPU 211.

Additionally, the processing illustrated in steps S503 to S505, S507 to 509, and S514 to S521 is processing performed by the image processing server 104. A program related to the processing and the learning data are stored in the HDD 303, read by the RAM 302, and executed by the CPU 301.

Further, the processing illustrated in steps S506, S510 to S511, and S515 is processing performed by the external server 111. A program related to the processing is stored in the HDD 313, read by the RAM 312, and executed by the CPU 311.

Since S501 to S506 in Modification 1 are the same as the processing in Embodiment 1, a description will be omitted.

In S507, based on the information obtained in S506, the CPU 301 determines whether the resource of the external server 111, in this case, the folders "written approval" and "invoice" of the external server 111, can be accessed. When there is one or more resources that can be accessed, the CPU 301 proceeds the processing to S520. On the other hand, when a resource that can be accessed is not found, the CPU 301 proceeds the processing to S514.

Here, S514 and later, which is an abnormal system, will be described first.

In S514, the CPU 301 obtains a list of resources of the external servers 111 that can be accessed by the user of the image forming apparatus 101. As in S505, this request is achieved by communication between the image processing server 104 and the external server 111 by using the communication technology called REST or SOAP. Additionally, in order to obtain the resources of the external server 111 that can be accessed by the user of the image forming apparatus 101, the CPU 301 sends, to the external server 111, an access token linked to the user, and user information, etc. linked to the access token. This processing is achieved by the authentication/authorization technology such as OAuth.

As a result of the communication, in S515, the CPU 311 of the external server 111 transmits, to the image processing server 104, the paths and identifiers (ID) of the resources that can be accessed by the user of the image forming apparatus 101 by using a data format, such as XML and JSON.

In S516, based on the obtained information, the CPU 301 performs, to the image forming apparatus 101, communication requesting display of the list of resources that can be accessed by the user of the image forming apparatus 101, on the touch-panel screen 401 of the operation unit 204. The processing in S516 is an example of the control for causing the operation unit 204 of the image forming apparatus 101 that has generated the scanned image data to display a screen including the list of resources for which the user has the access right.

In response to this, in S517, the CPU 211 of the image forming apparatus 101 displays the obtained list of resources that can be accessed, and receives a selection operation of the resource by the user of the image forming apparatus 101.

Figure 9A:
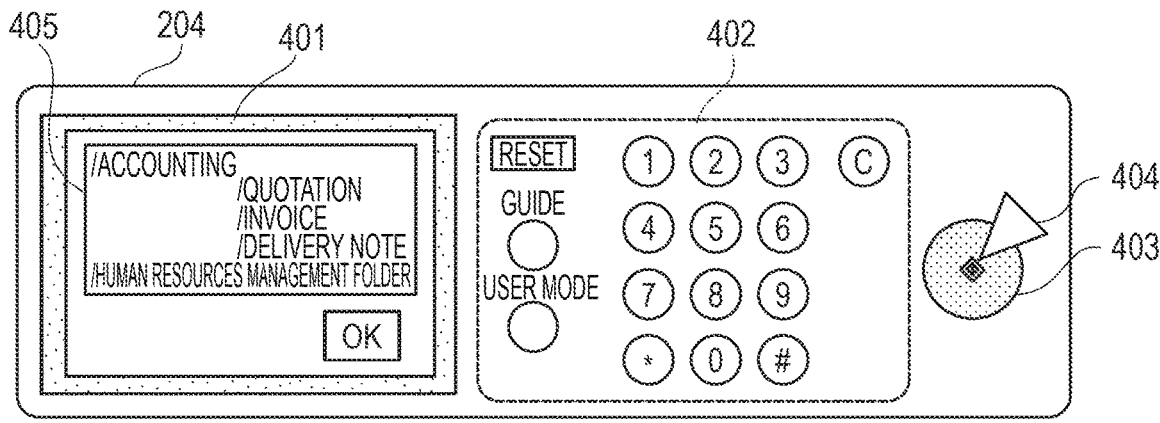
FIG. 9A, FIG. 9B and FIG. 9C are diagrams illustrating exemplary screens.

FIG. 9A is a diagram illustrating an example of a list of resources display screen for receiving the resource selection from the user. The user can select a desired resource for the image forming apparatus 101 by performing a touch operation on a list of resources display portion 405. Note that, although the folder is illustrated as an example of the resource in Modification 1, the resource may be anything such as the other metadata, as long as the resource of the external server 111 is selected. Then, when the user selects the displayed resource, the CPU 211 transmits the selected resource information to the image processing server 104.

In S518, the CPU 301 requests the image forming apparatus 101 to display a screen for determining whether to update the learning data based on the selected resource obtained by the communication in S517. The processing in S518 is an example of control for causing the operation unit 204 to display the screen for selecting whether to update the learning data based on the resource selected from the list of resources.

In response to this, in S519, the CPU 211 of the image forming apparatus 101 displays a selection screen of whether or not learning by the user of the image forming apparatus 101 can be performed, and receives a selection input by the user.

Figure 9B:
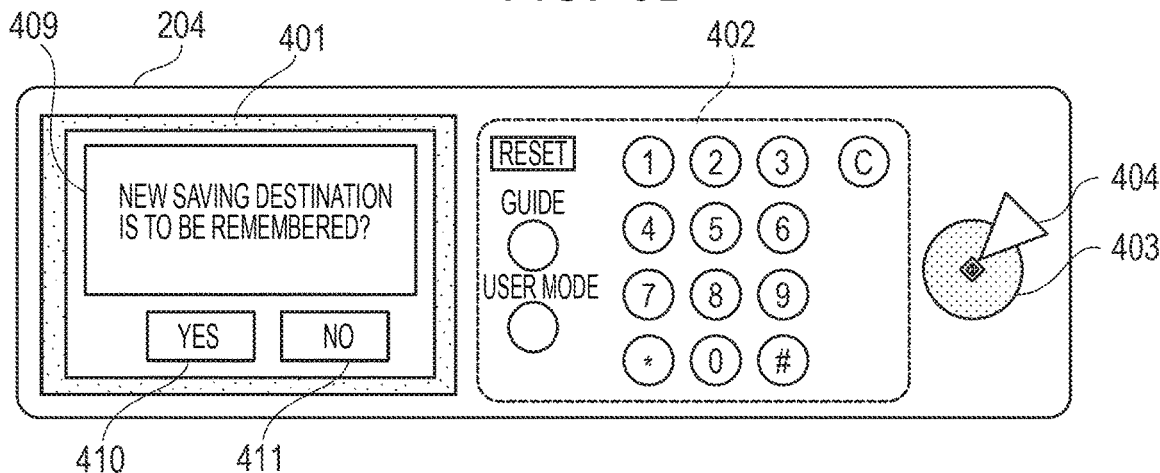

FIG. 9B is a diagram illustrating an example of a screen for receiving selection from the user. In Modification 1, the CPU 211 displays a message inquiring whether to overwrite the learning data with the selected folder, as illustrated in 409. On this screen, the user of the image forming apparatus 101 selects a button 410 for selecting that overwriting is to be performed. Additionally, on this screen, the user of the image forming apparatus 101 selects a button 411 for selecting that overwriting is not to be performed. In response to the selection by the user, the CPU 211 transmits the result to the image processing server 104.

In S520, based on the information obtained by the communication in S519, the CPU 301 determines whether to update the learning data. In this determination, when it is determined that updating of the learning data is required, the CPU 301 proceeds the processing to S521. On the other hand, in this determination, when it is determined that updating of the learning data is not required, the CPU 301 proceeds the processing to S508.

In S521, the CPU 301 updates a learning DB based on the information of the resource selected in S517. For example, when the original learning DB is Table 7, and the resource selected by the user of the image forming apparatus 101 is "/Accounting/Quotation", the CPU 301 updates the learning DB as illustrated in Table 8.

TABLE 7

| Image | Metadata Extraction Rule 1 | | Metadata Extraction Rule 2 | | Metadata Extraction Rule 3 | | Metadata Extraction Rule 4 | | Metadata Extraction Rule 5 | |
|---|---|---|---|---|---|---|---|---|---|---|
| Feature Amount | Key | Extraction Rule | Key | Extraction Rule | Key | Extraction Rule | Key | Extraction Rule | Key | Extraction Rule |
| [10, 12, 102, 11], [414, 15, 32, 12] . . . | File Name | [10, 12, 102, 11] | Folder | /Invoice | Deadline | [414, 15, 32, 12] | Billing Amount | [352, 1434, 120, 14] | Connection Destination | Cloud Service 1 |

TABLE 8

| Image | Metadata Extraction Rule 1 | | Metadata Extraction Rule 2 | | Metadata Extraction Rule 3 | | Metadata Extraction Rule 4 | | Metadata Extraction Rule 5 | |
|---|---|---|---|---|---|---|---|---|---|---|
| Feature Amount | Key | Extraction Rule | Key | Extraction Rule | Key | Extraction Rule | Key | Extraction Rule | Key | Extraction Rule |
| [10, 12, 102, 11], [414, 15, 32, 12] . . . | File Name | [10, 12, 102, 11] | Folder | /Accounting /Quotation | Deadline | [414, 15, 32, 12] | Billing Amount | [352, 1434, 120, 14] | Connection Destination | Cloud Service 1 |

After ending the processing in S521, the CPU 301 proceeds the processing to S508. Note that, since the processing of S508 and later is the same as that in Embodiment 1, a description will be omitted.

With the above-described processing, the metadata can be added to each page image data of the scanned image data in a manner simple for the user of the image forming apparatus 101. Further, in addition to the effects of Embodiment 1, the user of the image forming apparatus 101 can select the resource that can be accessed, and can further update the learning data. Accordingly, the user of the image forming apparatus 101 can transmit an image file and metadata to the resource that can be accessed by the user, even when the resource included in the learning data cannot be accessed.

Furthermore, even when the resource included in the learning data cannot be accessed, by saving the resource that can be accessed by the user in the learning data, the user can transmit the image file and metadata to the resource that can be accessed by the user from then on.

The description of Modification 1 ends here.

Modification 2

Modification 2 illustrates another processing for re-learning the learning data when the resource of the external server 111 cannot be accessed. With this, folder selection can be enabled even for the user of the image forming apparatus 101 who does not have the access right to the external server 111. Note that, in the description of Modification 2, the configuration and processing procedure that overlap with those of Embodiment 1 and Modification 1 will be indicated by the same reference numbers, a description of them will be omitted, and the configuration and processing procedure that are different from those of Embodiment 1 and Modification 1 will be mainly described.

Figure 10:
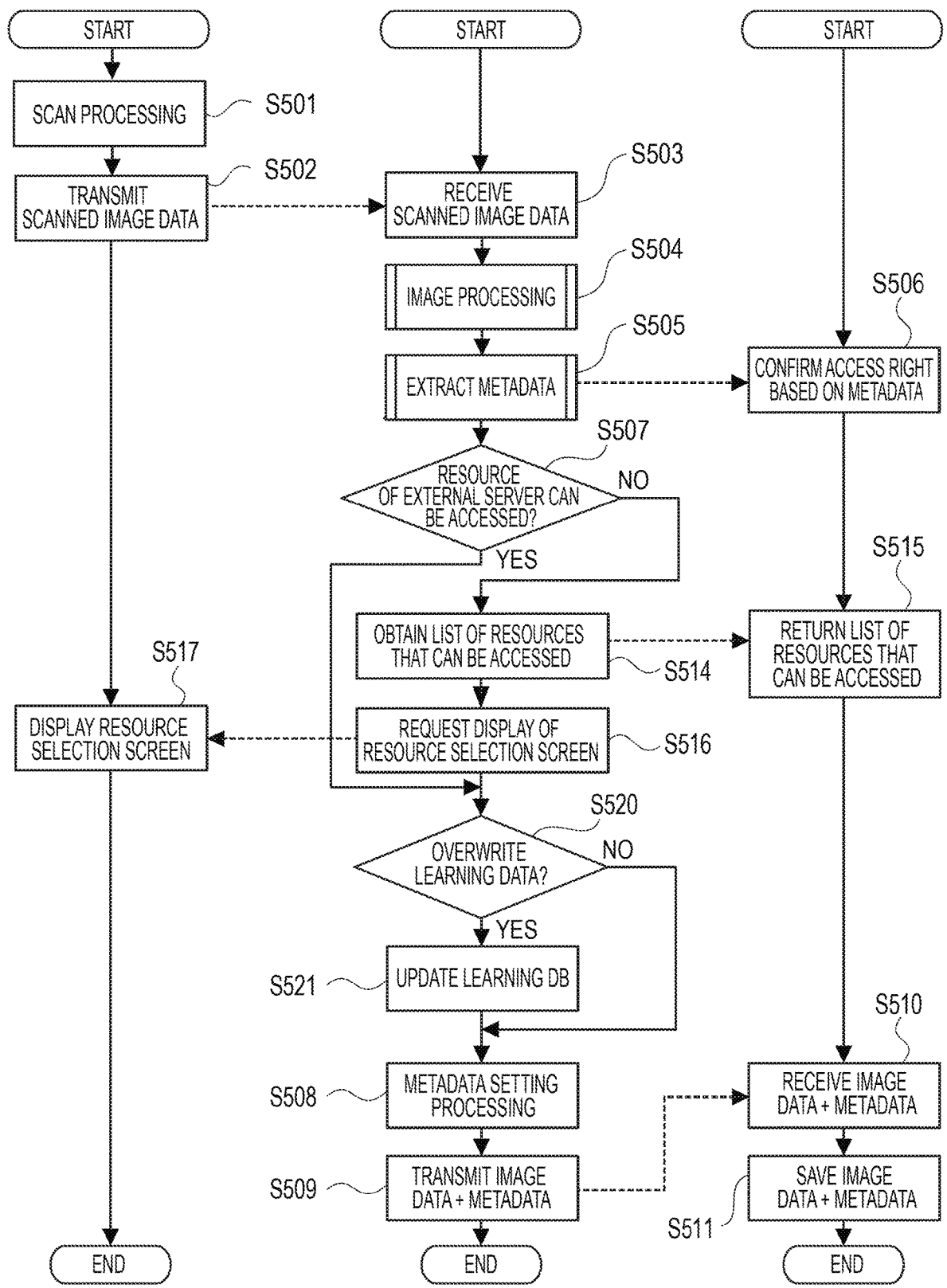
FIG. 10 is a diagram illustrating an example of the information processing in the image forming system in Modification 2.

FIG. 10 is a diagram illustrating an example of the information processing in the image forming system in Modification 2. Hereinafter, the information processing in Modification 2 will be described while using FIG. 10.

In S516, based on the information obtained in S514, the CPU 301 performs, to the image forming apparatus 101, communication requesting the operation unit 204 to display a screen including the list of resources that can be accessed by the user of the image forming apparatus 101, and a selection unit for selecting whether to update the learning data based on the resource selected from the list of resources. The processing in S516 is an example of control for causing the operation unit 204 of the image forming apparatus 101 that has generated the scanned image data to display the screen including the list of resources, and the selection unit for selecting whether to update the learning data based on the resource selected from the list of resources.

Figure 9C:
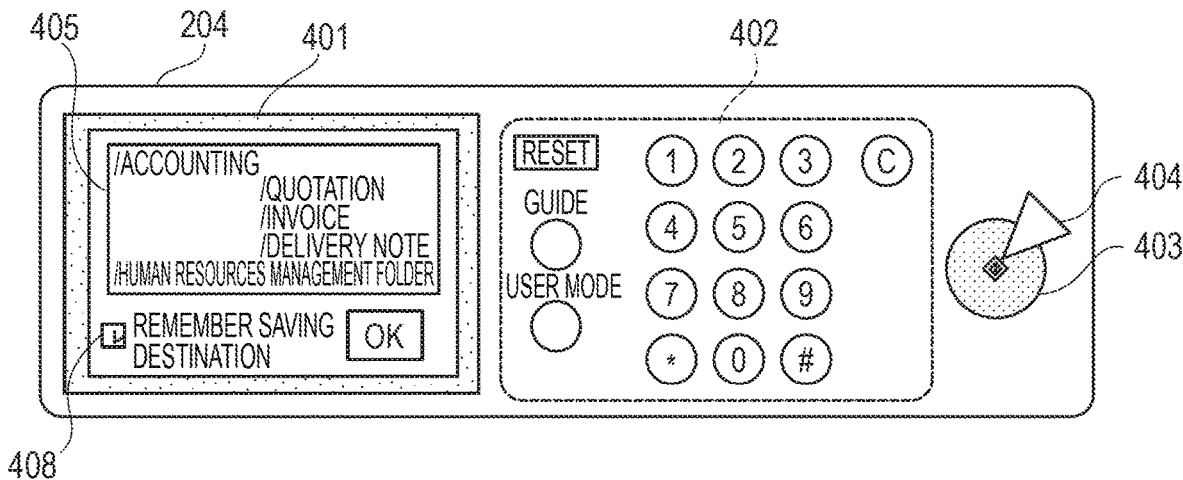

In S517, the CPU 211 of the image forming apparatus 101 displays the list of resources that can be accessed obtained in S516, and receives a selection operation of the resource by the user of the image forming apparatus 101. FIG. 9C is a diagram illustrating an example of the list of resources display screen for receiving the resource selection from the user. The user can select a desired resource for the image forming apparatus 101 by performing a touch operation on the list of resources display portion 405. Additionally, the user can select whether to update the learning data by using the selected resource destination, by touching a learning selection unit 408. Then, when the user confirms the displayed resource, and selects an OK, the CPU 211 transmits the selected resource information to the image processing server 104.

In S520, the CPU 301 determines whether to update the learning data based on the information obtained by the communication in S517. In this determination, when it is determined that updating of the learning data is required, the CPU 301 proceeds the processing to S521. On the other hand, in this determination, when it is determined that updating of the learning data is not required, the CPU 301 proceeds the processing to S508.

With the above-described processing, the metadata can be added to each page image data of the scanned image data in a manner simple for the user of the image forming apparatus 101. Further, in addition to the effects of Embodiment 1 and Modification 1, the user of the image forming apparatus 101 can select the resource that can be accessed, and select updating of the learning data on the same screen.

The description of Modification 2 ends here.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, metadata can be generated for each user, and image data can be uploaded to the saving destination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-146673, filed Aug. 8, 2019, which is hereby incorporated by reference herein in its entirety.

What is claimed is:

1. An information processing apparatus, comprising:
   at least one memory that stores a program; and
   at least one processor that executes the program to:
   receive scanned image data generated according to an operation by a user;
   obtain learning data associated with a saving destination that can be accessed by the user, the obtained learning data including one or more extraction rules used to extract metadata;
   extract metadata of the scanned image data based on the one or more extraction rules included in the obtained learning data associated with the saving destination that can be accessed by the user; and
   transmit the scanned image data and the extracted metadata to the saving destination associated with the learning data used to extract the metadata.

2. The information processing apparatus according to claim 1, wherein the at least one processor further executes the program to, when the metadata cannot be extracted based on the one or more extraction rules included in the obtained learning data associated with the saving destination that can be accessed by the user, cause an image forming apparatus that has generated the scanned image data to display, on an operation unit of the image forming apparatus, information indicating that the scanned image data cannot be transmitted.

3. The information processing apparatus according to claim 1, wherein the at least one processor further executes the program to, when the metadata cannot be extracted based on the one or more extraction rules included in the obtained learning data associated with the saving destination that can be accessed by the user, obtain a list of saving destinations for which the user has an access right and cause a screen including the list of saving destinations to be displayed.

4. The information processing apparatus according to claim 3, wherein the at least one processor further executes the program to cause a screen for selecting whether to update the learning data based on a saving destination selected from the list of saving destinations by the user to be displayed.

5. The information processing apparatus according to claim 1, wherein the at least one processor further executes the program to, when the metadata cannot be extracted based on the one or more extraction rules included in the obtained learning data associated with the saving destination that can be accessed by the user, obtain a list of saving destinations that can be accessed by the user and cause a screen, including the list of saving destinations, and a user interface, for selecting whether to update the learning data based on a saving destination selected from the list of saving destinations by the user, to be displayed.

6. An information processing method, comprising:
   receiving scanned image data generated according to an operation by a user;
   obtaining learning data associated with a saving destination that can be accessed by the user, the obtained learning data including one or more extraction rules used to extract metadata;
   extracting metadata of scanned image data based on the one or more extraction rules included in the obtained learning data associated with the saving destination that can be accessed by the user; and
   transmitting the scanned image data and the extracted metadata to the saving destination associated with the learning data used to extract the metadata.

7. A non-transitory computer readable storage medium storing a program for causing a processor to perform:
   receiving scanned image data generated according to an operation by a user;
   obtaining learning data associated with a saving destination that can be accessed by the user, the obtained learning data including one or more extraction rules used to extract metadata;
   extracting metadata of the scanned image data based on the one or more extraction rules included in the obtained learning data associated with the saving destination that can be accessed by the user; and
   transmitting the scanned image data and the extracted metadata to the saving destination associated with the learning data used to extract the metadata.

* * * * *